US010504639B2

(12) United States Patent
Bockarev et al.

(10) Patent No.: US 10,504,639 B2
(45) Date of Patent: Dec. 10, 2019

(54) OVERVOLTAGE ARRESTER

(71) Applicant: SIEMENS AKTIENGESELLSCHAFT, Munich (DE)

(72) Inventors: Alexander Bockarev, Berlin Marzahn-Hellersdorf (DE); Bastian Robben, Berlin (DE); Henrik Roggow, Berlin (DE); Markus Sulitze, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 15/268,780

(22) Filed: Sep. 19, 2016

(65) Prior Publication Data

US 2017/0084367 A1 Mar. 23, 2017

(30) Foreign Application Priority Data

Sep. 18, 2015 (EP) .................................... 15185825

(51) Int. Cl.
*H02H 1/00* (2006.01)
*H01C 7/12* (2006.01)
*H01C 1/01* (2006.01)

(52) U.S. Cl.
CPC ................. *H01C 7/12* (2013.01); *H01C 1/01* (2013.01)

(58) Field of Classification Search
CPC .................................... H01C 7/12; H01C 1/01
USPC .......................................................... 361/127
See application file for complete search history.

(56) References Cited

U.S. PATENT DOCUMENTS

| | | | | | |
|---|---|---|---|---|---|
| 5,684,664 | A * | 11/1997 | Julke | H01B 17/32 29/887 |
| 5,896,266 | A | 4/1999 | Rubinski | |
| 5,912,611 | A | 6/1999 | Berggren et al. | |
| 5,936,826 | A | 8/1999 | Schmidt | |
| 5,942,968 | A * | 8/1999 | Schmidt | H01C 7/12 338/101 |
| 6,008,975 | A | 12/1999 | Kester et al. | |
| 6,777,614 | B1 | 8/2004 | Suenwoldt | |
| 8,446,703 | B2 | 5/2013 | Klaube et al. | |
| 2008/0088406 | A1 * | 4/2008 | Klaube | H01C 7/12 338/21 |

(Continued)

FOREIGN PATENT DOCUMENTS

| | | | |
|---|---|---|---|
| CN | 1161755 | A | 10/1997 |
| CN | 1184319 | A | 6/1998 |

(Continued)

*Primary Examiner* — Thienvu V Tran
*Assistant Examiner* — Lucy M Thomas
(74) *Attorney, Agent, or Firm* — Laurence Greenberg; Werner Stemer; Ralph Locher

(57) ABSTRACT

Overvoltage arresters are used to protect against overvoltages in electrical energy transmission systems. An overvoltage arrester has a discharge column which extends along a longitudinal axis and is clamped in between end fittings by a plurality of tensile elements which radially surround the discharge column and are secured in the end fittings. At least one of the end fittings has a first thread for attaching a connecting bolt. Furthermore, the end fitting has a fitting body with a second thread for receiving a pressure screw for generating an axial force on the discharge column. Accordingly the first and second threads overlap along an axial section.

5 Claims, 6 Drawing Sheets

(56) References Cited

U.S. PATENT DOCUMENTS

2014/0218834 A1 8/2014 Klaube et al.

FOREIGN PATENT DOCUMENTS

| | | | |
|---|---|---|---|
| CN | 1294745 | A | 5/2001 |
| CN | 1369125 | A | 9/2002 |
| CN | 101208759 | A | 6/2008 |
| DE | 102009008463 | A1 | 8/2010 |
| DE | 102009035646 | A1 | 2/2011 |
| EP | 726581 | A2 | 8/1996 |
| WO | 20060125753 | A1 | 11/2006 |
| WO | 2012098250 | A1 | 7/2012 |

* cited by examiner

OVERVOLTAGE ARRESTER

CROSS-REFERENCE TO RELATED APPLICATION

This application claims the priority, under 35 U.S.C. § 119, of European application EP 15185825.5, filed Sep. 18, 2015; the prior application is herewith incorporated by reference in its entirety.

BACKGROUND OF THE INVENTION

Field of the Invention

The invention relates to overvoltage arresters such as are used for protecting against overvoltages in electrical energy transmission systems. Such an overvoltage arrester is connected electrically at one end to a high voltage or medium voltage transmission line and at the other end to ground potential. In the normal operating mode, the overvoltage arrester acts as an insulator. When an overvoltage occurs as a result of, for example, a lightning strike or switching processes, the overvoltage arrester becomes conductive and conducts the overvoltage away to the ground. When the overvoltage has decayed, the overvoltage arrester becomes insulating again. For this purpose, the overvoltage arrester has a discharge column with a voltage-dependent electrical resistor, referred to as a varistor. Below a threshold voltage which is a material property of the varistor, the discharge column has a high impedance and acts as an insulator. When the threshold voltage is exceeded, the resistance of the varistor decreases, and the discharge column becomes conductive and conducts away the overvoltage to ground.

For applications in electrical transmission systems, a discharge column of an overvoltage arrester is frequently constructed as a cylindrical column composed of individual varistor blocks which are stacked one on top of the other. The varistor blocks are themselves cylindrical, usually circular-cylindrical, blocks made of a voltage-dependent material such as, for example, zinc oxide or silicon carbide. These are stacked one on top of the other by their end faces to form the discharge column. So that, on the one hand, the discharge column is mechanically stable and, on the other hand, the varistor blocks have good electrical contact with one another, the discharge column must be held together under pressure. Two different designs are in principle differentiated.

In the case of the so-called pipe design, the discharge column is arranged in a mechanically stable housing and clamped in between flanges of the housing.

In the so-called cage design, the discharge column is surrounded by a cage made of tensile elements, for example made of glass-fiber-reinforced plastic, which are clamped in end fittings and in this way hold the discharge column together.

There are also mixed forms in which a discharge column which is clamped in by tensile elements is arranged in a mechanically stable housing. This increases the mechanical stability and facilitates assembly.

For open-air applications, the overvoltage arrester has an external sheath made of a weather-proof material such as, for example, silicone.

The invention relates to an overvoltage arrester of a cage design irrespective of whether the overvoltage arrester is additionally arranged in a mechanically stable housing.

International patent disclosure WO 2006/125753 A1 presents such an overvoltage arrester. The end fittings in which the tensile elements are clamped in have a continuous axial drilled hole with a thread. On the one hand, a pressure screw is screwed into the thread and exerts an axial pressure on the discharge column. On the other hand, a connecting bolt which is accessible from the outside and is used for electrical connection is screwed into the drilled hole. For the transmission of the necessary forces both require a minimum length to be screwed into the thread. This essentially determines the thickness of the end fitting. Efforts to make the end fitting more compact in order to reduce the overall length of the overvoltage arrester are made more difficult by the necessary minimum length.

SUMMARY OF THE INVENTION

The object of the invention is to specify an overvoltage arrester with compact end fittings.

In this context, an overvoltage arrester has a discharge column which extends along a longitudinal axis and is formed from a plurality of varistor blocks stacked one on top of the other. The discharge column is clamped in between end fittings by a plurality of tensile elements which radially surround the latter and are secured in the end fittings. At least one of the end fittings has a first thread for attaching a connecting bolt. The connecting bolt is used to connect the overvoltage arrester to an overhead line of an energy transmission system. Furthermore, the end fitting has a fitting body with a second thread for receiving a pressure screw for generating an axial force on the discharge column. By means of the pressure screw, the discharge column is pressed together axially in order to permit contact as well as possible between the varistor blocks forming the discharge column. According to the invention there is provision that the first thread and the second thread are arranged with respect to one another such that they overlap along an axial section that is a section which extends parallel to the longitudinal axis. The first and second threads are therefore arranged parallel to one another and parallel to the longitudinal axis in such a way that a plane which is radial, that is to say oriented perpendicularly with respect to the longitudinal axis, and which lies within this axial section, intersects both the first thread and the second thread. As a result, the fitting body and therefore the end fitting can be constructed shortened in height by the length of the axial section.

The first and second threads are preferably arranged coaxially with respect to one another and with respect to the longitudinal axis. This facilitates the manufacture and assembly.

In a preferred first embodiment, the first thread is also an internal thread which is arranged in the fitting body. The first and second threads are arranged coaxially with respect to one another and with respect to the longitudinal axis. The pressure screw is embodied in the manner of a pot and is screwed into the second thread. The pressure screw has a base which points toward the discharge column and a side wall extending away from the base and away from the discharge column. The base and the side wall enclose a hollow interior space. The fitting body has an annular axial depression which extends outward in the axial direction from the internal end of the first thread, that is to say the one pointing toward the discharge column, that is to say away from the discharge column. The second thread extends into the axial depression. The thread can be arranged on the external wall or internal wall of the depression here.

The base preferably has a tool receptacle for receiving a screwing tool. The tool receptacle may for example be a hexagonal hole for receiving an Allen key. As a result, a tool can be inserted through the drilled hole of the first thread in order to turn the pressure screw from the outside and therefore clamp the discharge column.

In one preferred refinement of the first embodiment, the pressure screw has one or more injection openings which are used for injecting sealing compound into the hollow interior space. Each injection opening preferably extends from the base as far as into the side wall of the pressure screw. It is therefore possible, when manufacturing the external sleeve, which is usually manufactured by injection molding, for the interior space to be filled at the same time with sealing compound and therefore sealed. Complex sealing measures can therefore be dispensed with.

It is also preferred that the second thread is an internal thread and the pressure screw has a corresponding external thread on its side wall. The pressure screw has here a cylindrical external lateral face with a thread corresponding to the second thread.

In a second embodiment of the invention, the fitting body is embodied in an annular fashion with a cylindrical internal lateral face, wherein the second thread is arranged on the internal lateral face. The pressure screw has here a cylindrical external lateral face with a thread corresponding to the second thread. In order to clamp the discharge column, the fitting body is secured, while the pressure screw is turned by a tool. Alternatively, the pressure screw can be secured and the two fitting bodies lying opposite one another can be turned together, along with the discharge column and the tensile elements. Here, the first and second threads on one of the end fittings are preferably embodied as left-handed threads, and embodied as right-handed threads on the end fitting lying opposite. It is therefore possible to clamp both end fittings equally in one operation.

It is advantageous with the second embodiment if the pressure screw penetrates the fitting body completely, wherein the first thread is arranged in the pressure screw. The pressure screw can therefore be configured and manufactured particularly easily.

In a third embodiment of the invention, the first thread is arranged in the fitting body, wherein a plurality of second threads is arranged distributed around the first thread at a radial distance around the first thread. In this context, a pressure screw is arranged in each second thread. The discharge column is therefore clamped outside the longitudinal axis at a plurality of locations, permitting better pressure distribution to the discharge column to be achieved.

Other features which are considered as characteristic for the invention are set forth in the appended claims.

Although the invention is illustrated and described herein as embodied in an overvoltage arrester, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are provided with the same reference symbols in all the figures.

Figure 1:
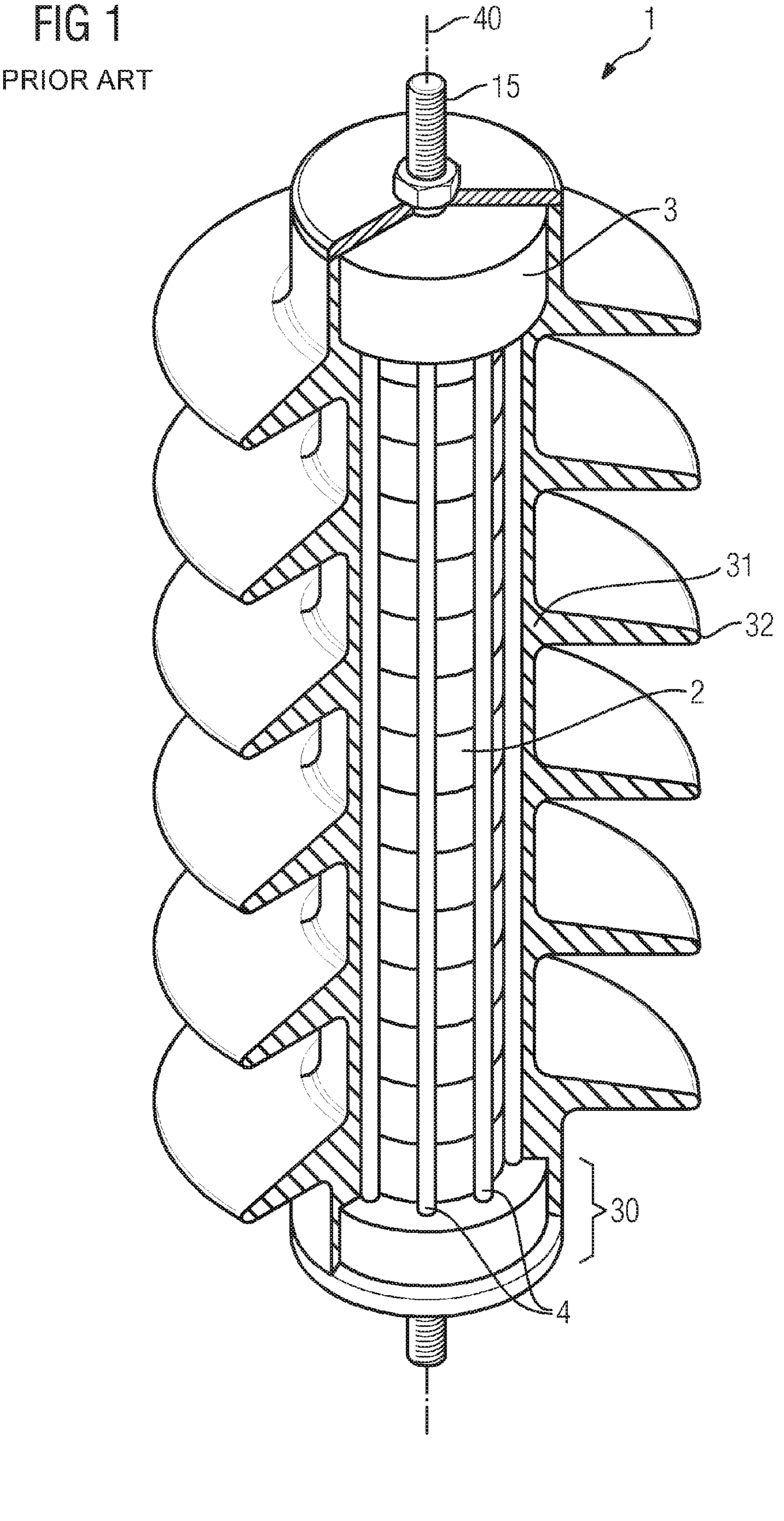
FIG 1 PRIOR ART
FIG. 1 is a diagrammatic, partial sectional view of an overvoltage arrester according to the prior art.

Referring now to the figures of the drawings in detail and first, particularly to FIG. 1 thereof, there is shown a conventional overvoltage arrester 1 with the so-called cage design with a discharge column 2 which is composed of a plurality of varistor elements. Apart from the varistor elements, the discharge column 2 can also contain further elements such as, for example, metal blocks (not illustrated) for length compensation. The discharge column 2 is secured at both ends by end fittings 30. The overvoltage arrester 1 can be integrated into the power supply system by a connecting bolt 15 which projects out of the end fitting 30. In order to obtain the required mechanical strength, for example against flexural loading, tensile elements 4 which are located around the outside of the discharge column and parallel to the longitudinal axis 40 of the overvoltage arrester and which hold the discharge column 2 together under tension are clamped into the end fittings 30. These tensile elements 4 are embodied as rods made of glass-fiber-reinforced plastic. In order to protect against environmental influences, the overvoltage arrester is often provided with an external sleeve 31 made of silicone. Screens 32 are provided on the outside of the sleeve 31 in order to increase the creepage path of the current.

Figure 2:
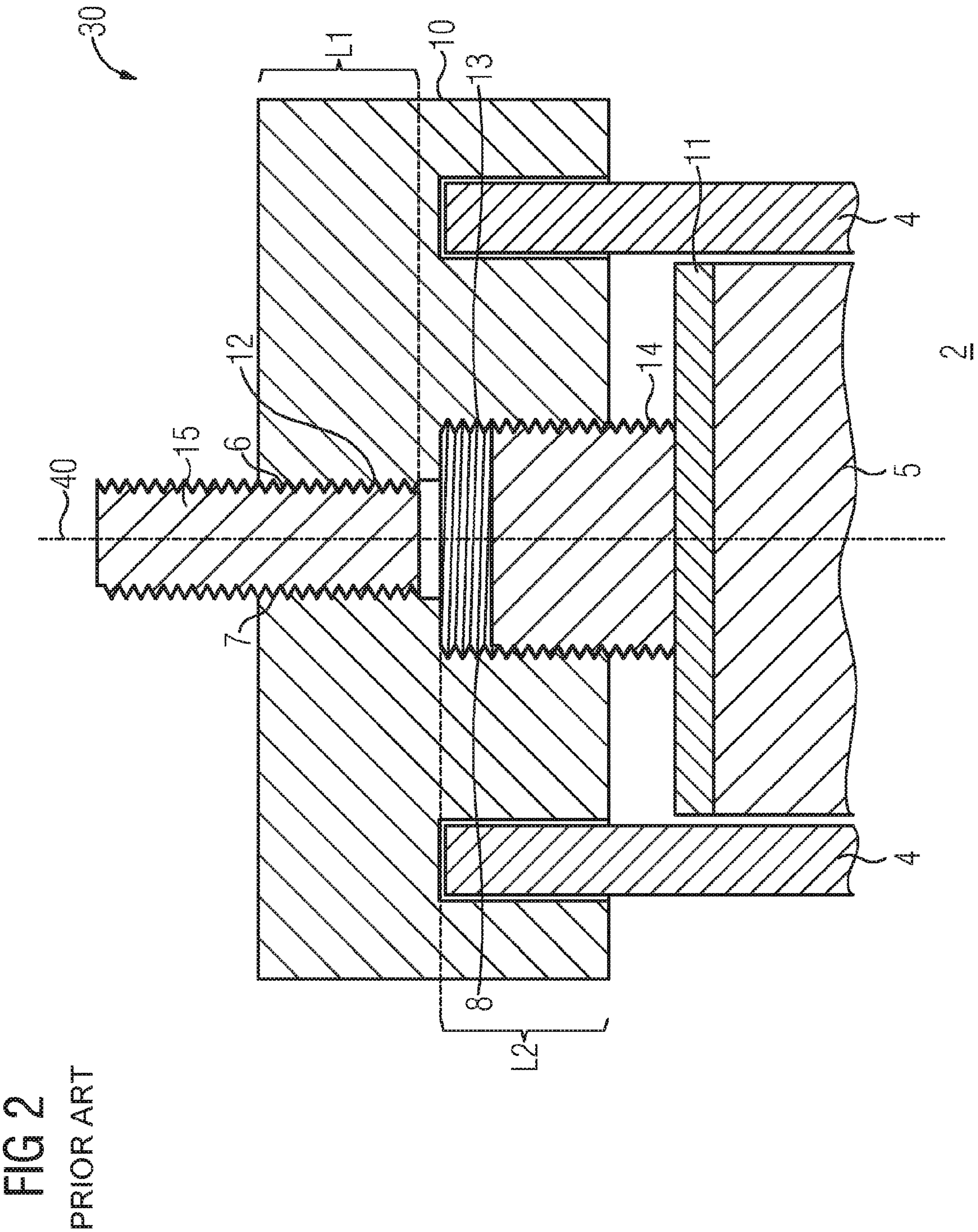
FIG 2 PRIOR ART
FIG. 2 is a sectional view of a conventional end fitting.

FIG. 2 shows an end fitting 30 such as is used in an overvoltage arrester shown in FIG. 1. The end fitting which is arranged at the opposite end of the overvoltage arrester is of the same design as the latter. The tensile elements 4 are clamped in the end fittings 30. The tensile elements 4 can be screwed, wedged or crimped in the end fitting 30. The end fittings 30 have a continuous drilled hole 6. The latter has, in contrast to international patent disclosure WO 2006/125753 A1, sections 12 and 13 with different widths here. The first section 12 has a first thread 7 and the second section 13 has a second thread 8. According to the invention, screw threads which are arranged as internal threads on an internal lateral face of a circular-cylindrical drilled hole or as an external thread on a circular-cylindrical external lateral face are understood to be threads. The first section 12 with the first thread 7 and the second section 13 with the second thread 8 are arranged coaxially one behind the other. In the first section 12, a connecting bolt 15 is screwed into the first thread 7 on the outside of the end fitting 30. In the second section 13, a pressure screw 14 is screwed into the second thread 8. The pressure screw 14 is screwed in from the inner side of the end fitting 30, and after the assembly of the discharge column 2, composed of the varistor blocks 5, and the tensile elements 4 is screwed in through the central drilled hole 6 in the axial direction with respect to the discharge column 2 by a tool. As a result, a force is applied to the discharge column 2 and the force is taken up by the tensile elements 4. For the sake of better pressure distribution, a pressure washer 11 can be arranged between the pressure screw 14 and the outermost varistor block 5 of the discharge column 2. After the clamping of the discharge column 2, the connecting bolt 15 can be screwed into the first thread 7 of the central drilled hole 6.

Both the first thread 7 and the second thread 8 require a certain minimum length L1 or L2, since connecting bolts 15 and the pressure screw 14 each require a certain screw-in depth in order to be able to dissipate the forces which occur to the flange. In particular, the second thread 8 must also have sufficient room for maneuver for the pressure screw 14 to be able to be turned sufficiently far out of the second thread 8 in order to transmit the necessary pressure force to the discharge column 2. The necessary minimum length L1, L2 of the thread 7, 8 determines the minimum overall height of the end fitting 30 and limits effort to make the latter more compact.

Figure 3:
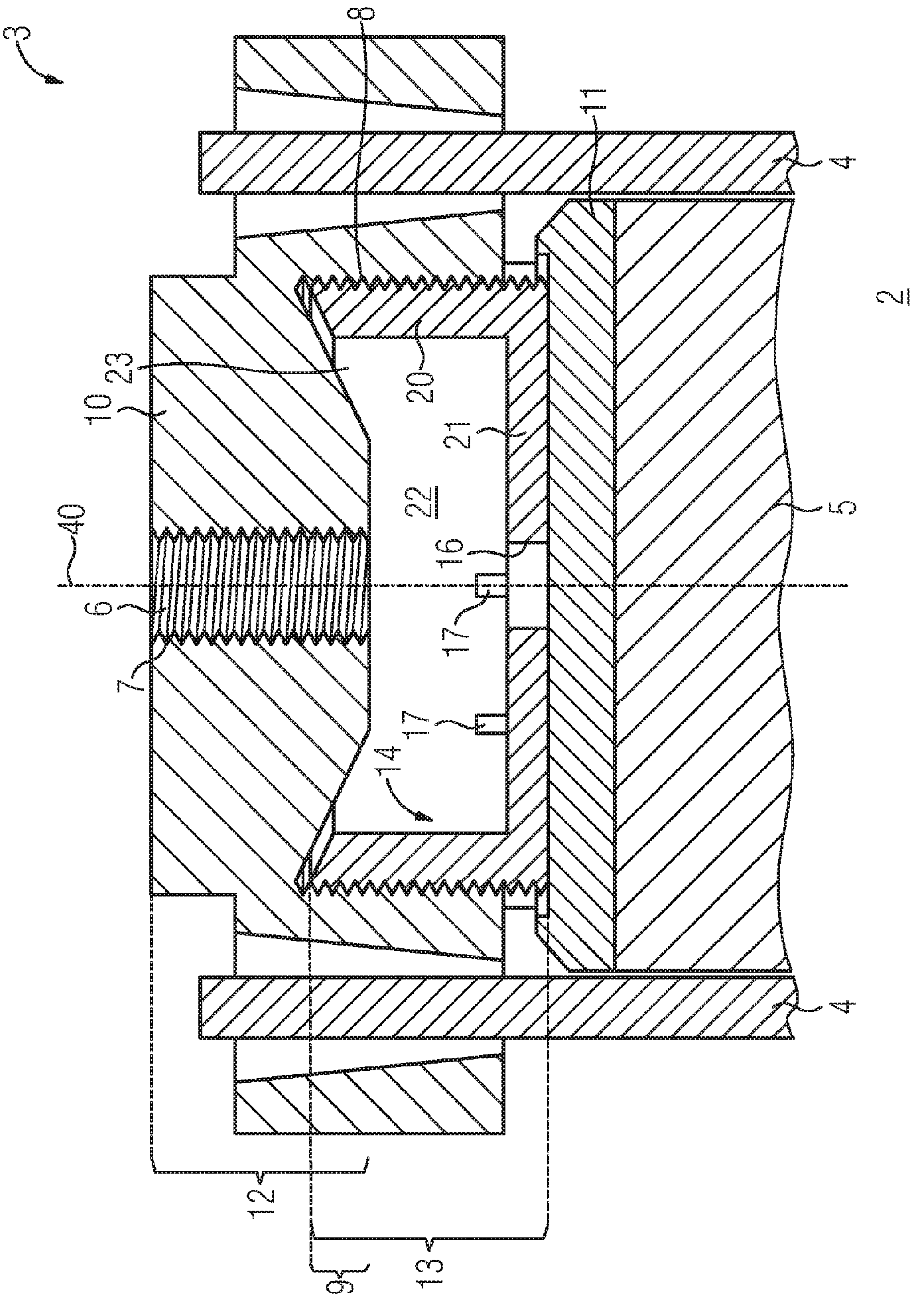
FIG. 3 is a sectional view of a first embodiment of an overvoltage arrester according to the invention.
Figure 4:
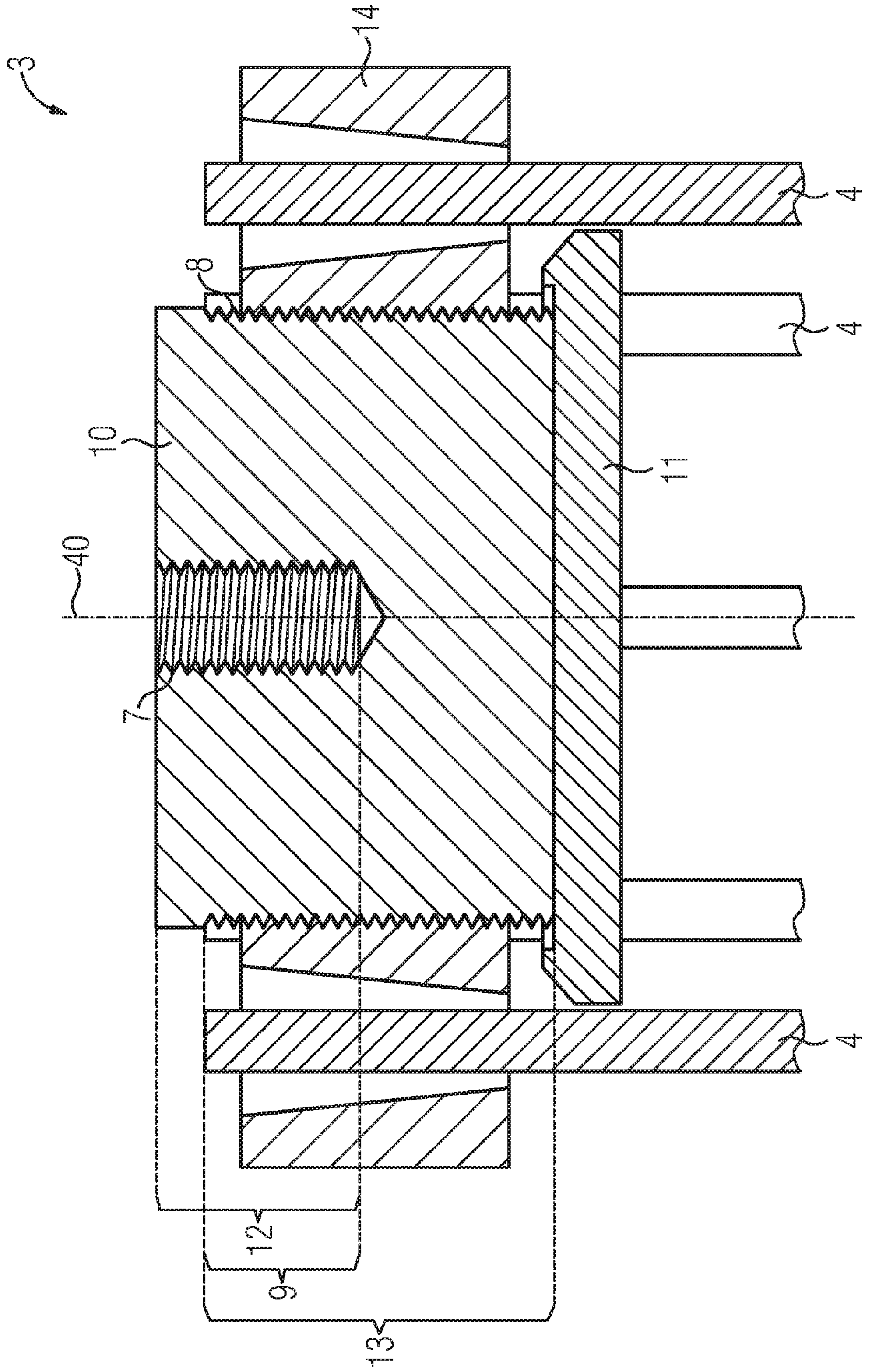
FIG. 4 is a sectional view of a second embodiment of the overvoltage arrester according to the invention.

FIG. 3 shows a first embodiment of an end fitting 3 according to the invention, which end fitting 3 permits a more compact design. In this context, in comparison with the end fitting 30 in FIG. 2 a central drilled hole 6 of the fitting body 10 is greatly enlarged in diameter in the region of the second section 13. Instead of a solid pressure screw 14, the latter is configured here in a pot-like fashion with a hollow-circular-cylindrical side wall 20 and a circular base 21 which terminates the side wall 20 at the end side. The base 21 bears against the discharge column 2 and the side wall 20 extends away from the discharge column 2 from the base 21. In the region of the side wall 20, the fitting body 10 has an annular axial depression 23 which is directed away from the discharge column 2 and into which the side wall 20 of the pressure screw 14 dips. The second thread 8 extends into this depression 23. The first section 12 with the first thread 7 and the second section 13 with the second thread 8 overlap in this way in an axial section 9. The first and second threads 7, 8 are therefore arranged parallel to one another and parallel to the longitudinal axis 40 in such a way that a plane which is radial, that is to say one which is oriented perpendicularly with respect to the longitudinal axis, and which lies within this axial section 9 intersects both the first thread 7 and the second thread 8. As a result, the fitting body 10 and therefore the end fitting 3 can be constructed shortened in terms of height by the length of the section 9.

In the region of the base 21, the pressure screw 14 has a tool receptacle 16, here in the form of a hexagon socket. A tool can be inserted therein from the outside through the central drilled hole 6, in order to turn the pressure screw 14 and press against the discharge column 2, in order to generate the necessary pressure force. Instead of a hexagon socket, the base 21 could also have a receptacle for a plug-in key on its side opposite the discharge column 2.

The base 21 can also have one or more injection openings 17 which extend into the side wall 20. During the casting of the external sleeve 31, sealing compound, for example silicone, can enter the interior space 22 of the pressure screw 14 through these injection openings 17 and therefore seal the central drilled hole 6. Previously customary sealing of the outside of the end fitting 3 can therefore be dispensed with.

In a second embodiment of the invention, the fitting body 10 is embodied in an annular fashion. It has a cylindrical internal lateral face on which the second thread 8 is arranged. The pressure screw 14 has a cylindrical external lateral face with a thread which corresponds thereto. In the preferred embodiment illustrated here, the pressure screw 14 penetrates the fitting body 10 completely. The first thread 7 is arranged in the pressure screw 14 preferably coaxially with respect to the second thread 8 as illustrated here. The first thread extends over a first section 12 and the second over a second section 13. The two sections 12, 13 overlap in the axial section 9.

Figure 5:
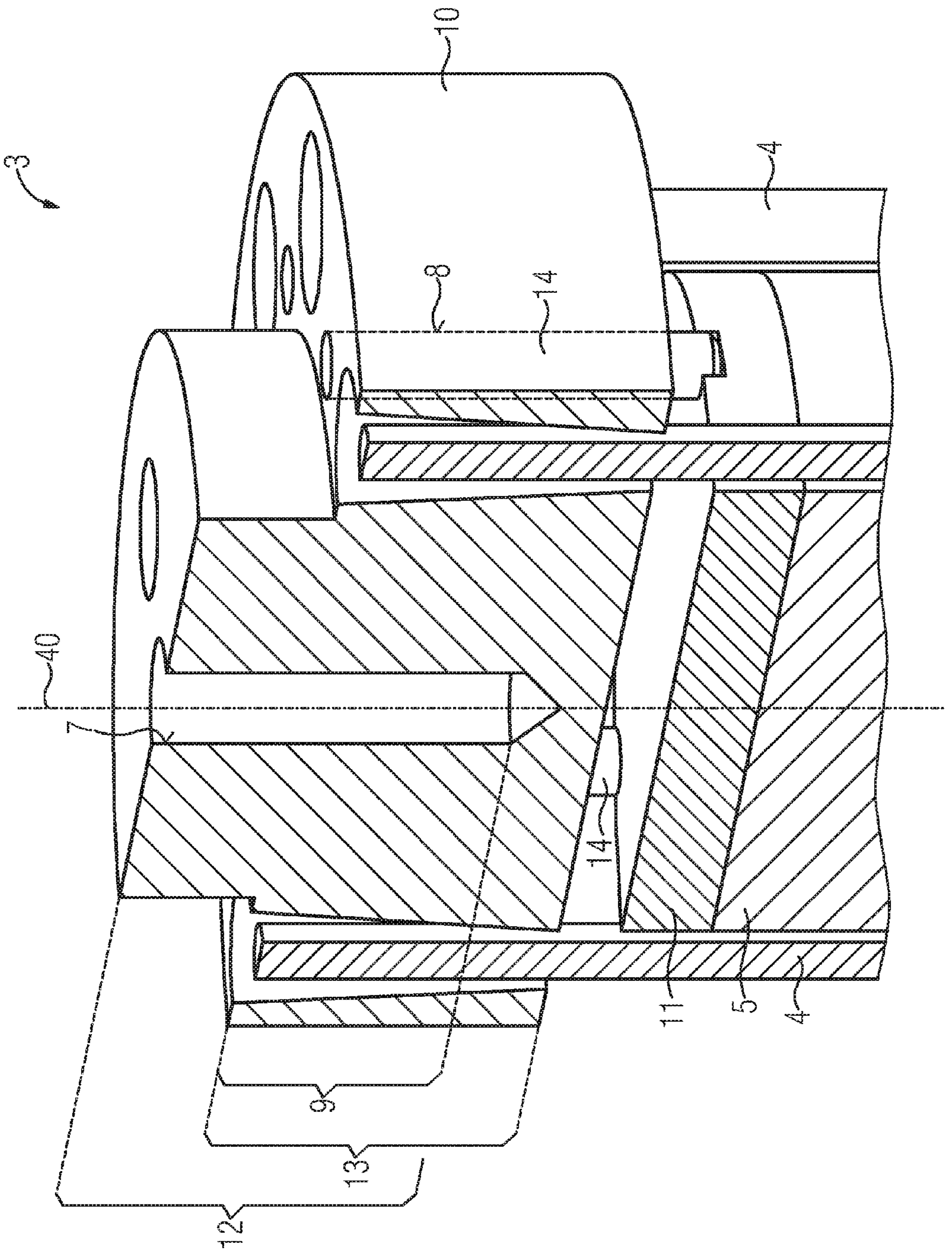
FIG. 5 is a partial sectional view of a third embodiment of the overvoltage arrester according to the invention.
Figure 6:
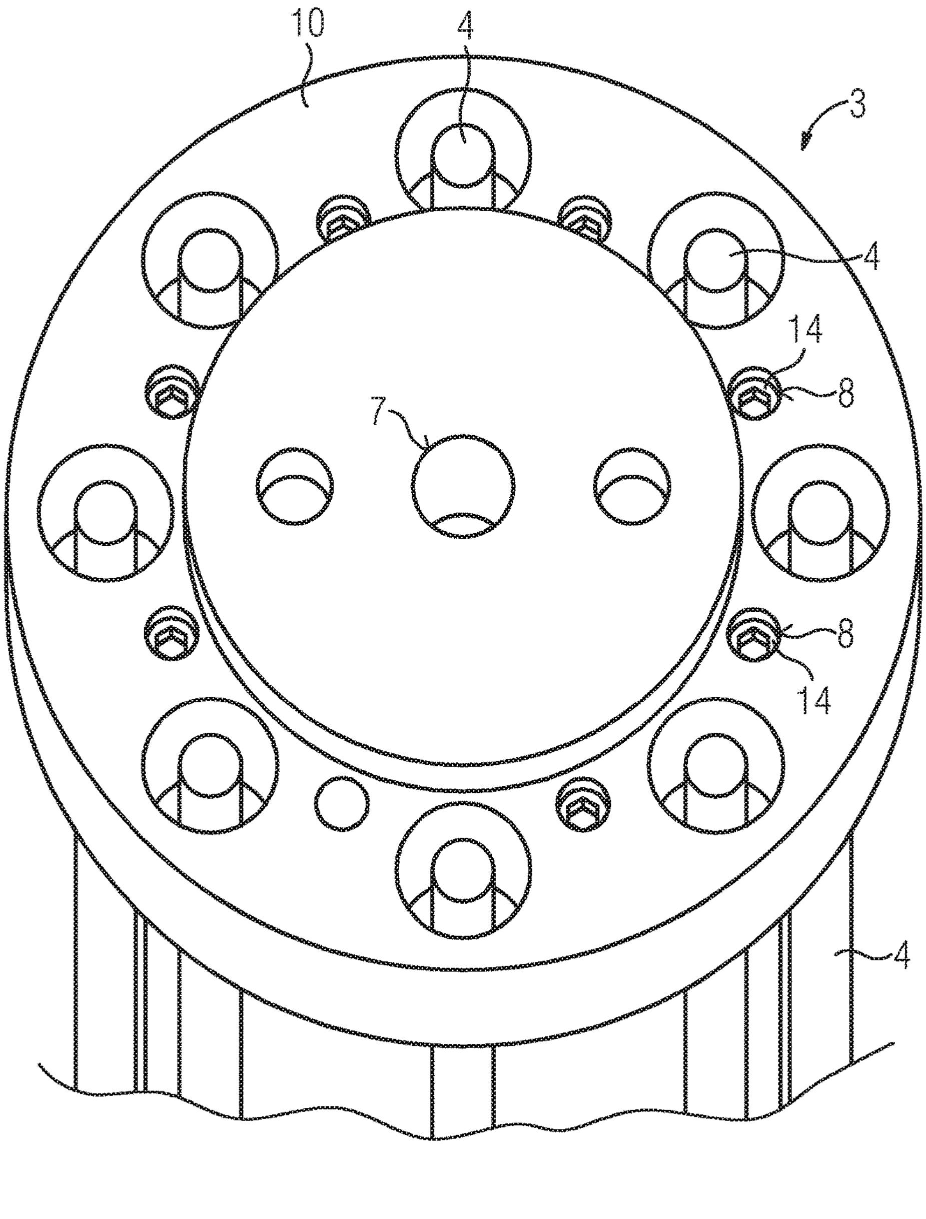
FIG. 6 is a diagrammatic, perspective view of the third embodiment.

FIGS. 5 and 6 show a third embodiment of the invention from different perspectives. Here, the first thread 7 is arranged in the fitting body 10. A plurality of second threads 8 are arranged distributed in a circular shape around the center point of the first thread 7 at a radial distance in the fitting body 10. A pressure screw 14, which is pressed against the discharge column 2 or against the pressure washer 11 in the clamped state, is arranged in each of the second threads 8. As in the previously described embodiments, the first thread 7 extends over the first section 12, and the second thread 8 extends over the axial section 13. In the axial section 9, the first section 12 and the second section 13 overlap. The pressure screws 14 are preferably embodied as threaded pins, also referred to as grub screws.

The invention claimed is:

1. An overvoltage arrester, comprising:

end fittings;

a plurality of tensile elements;

a discharge column extending along a longitudinal axis and clamped in between said end fittings by means of said plurality of tensile elements radially surrounding said discharge column and secured in said end fittings; and at least one of said end fittings having a pressure screw, a first thread for attaching to a connecting bolt and a fitting body with a second thread for receiving said pressure screw for generating an axial force on said discharge column, said first and second threads overlapping along an axial section;

said first thread disposed in said fitting body;

said pressure screw embodied in a manner of a pot having a base which points toward said discharge column and a side wall extending away from said base and enclosing a hollow interior space; and said fitting body having an axial depression formed therein and said second thread extending into said axial depression.

2. The overvoltage arrester according to claim 1, wherein said first and second threads are disposed coaxially with respect to one another and with respect to the longitudinal axis.

3. The overvoltage arrester according to claim 1, wherein said base has a tool receptacle for receiving a screwing tool.

4. The overvoltage arrester according to claim 1, wherein said pressure screw has injection openings for injecting sealing compound into the hollow interior space.

5. The overvoltage arrester according to claim 1, wherein said second thread is an internal thread and said pressure screw has a corresponding external thread on a side wall.

* * * * *